United States Patent [19]
Bros

[11] Patent Number: 5,478,507
[45] Date of Patent: Dec. 26, 1995

[54] GAS-LIQUID CONTACTING APPARATUS WITH VALVED DOWNCOMER

[75] Inventor: David E. Bros, Edina, Minn.

[73] Assignee: Carbonair, Inc., Maple Grove, Minn.

[21] Appl. No.: 197,938

[22] Filed: Feb. 16, 1994

[51] Int. Cl.$^6$ ................................................. B01F 3/04
[52] U.S. Cl. ........................................ 261/114.1; 261/66
[58] Field of Search .................................. 261/113, 114.1, 261/30, 66; 137/855, 512.15, 527, 527.6, 527.8

[56] References Cited

U.S. PATENT DOCUMENTS

| | | |
|---|---|---|
| 3,410,540 | 11/1964 | Bruckert . |
| 3,434,701 | 3/1969 | Bauer . |
| 3,797,811 | 3/1974 | Jullian et al. .......................... 261/114.1 |
| 3,807,143 | 4/1974 | Dunn . |
| 3,887,665 | 6/1975 | Mix et al. . |
| 4,265,167 | 5/1981 | Mojonnier et al. . |
| 4,341,640 | 7/1982 | Landis . |
| 4,361,522 | 11/1982 | Goettl ........................................ 261/66 |
| 4,412,924 | 11/1983 | Feather . |
| 4,556,522 | 12/1985 | Wilson . |
| 4,608,163 | 8/1986 | Yohe et al. . |
| 4,621,945 | 11/1986 | Schafer et al. . |
| 4,663,089 | 5/1987 | Lowry et al. . |
| 4,869,832 | 9/1989 | Lamarre . |
| 4,872,955 | 10/1989 | Parker et al. .......................... 261/114.1 |
| 4,889,620 | 12/1989 | Schmit et al. .......................... 261/122.1 |
| 4,954,147 | 9/1990 | Galgon . |
| 4,954,294 | 9/1990 | Bannon . |
| 5,004,010 | 4/1991 | Huet ......................................... 137/527.6 |
| 5,020,567 | 6/1991 | Proulx . |
| 5,045,215 | 9/1991 | Lamarre . |
| 5,084,175 | 1/1992 | Hoffmeier . |
| 5,102,583 | 4/1992 | Bannon . |
| 5,106,556 | 4/1992 | Binkley et al. ......................... 261/114.1 |
| 5,135,551 | 8/1992 | Fielding . |
| 5,213,719 | 5/1993 | Chuang .................................. 261/114.1 |
| 5,240,595 | 8/1993 | Lamarre . |
| 5,242,628 | 9/1993 | Nye ........................................ 261/114.1 |
| 5,352,276 | 10/1994 | Rentschler et al. ................... 261/114.1 |

FOREIGN PATENT DOCUMENTS 76865  11/1961  France ................................. 137/527.6

OTHER PUBLICATIONS

"STAT Series Sieve Tray Aeration Technology", Product Data Sheet EE198–92, 1992 by Carbonair.
"Pre–Engineered Remediation Packages", 1992 by Carbonair.
"The Stripper® Multi–Staged Diffused Bubble Aeration System from Lowry Engineering, Inc. U.S. Pat. No. 4,663,089" The Alternative to Packaged Tower Aeration For Public Water Supplies.
"Inside a Trayed Distillation Column", Tak Yangai, Fractionation Research, Inc., Chemical Engineering, Nov. 1990, (pp. 120–129).
"Air Stripping Without Packing or Blowers", Hazelton Environmental Products, Inc., Bulletin 101,005 Rev. 9/9?.
"Treatment, Waste Management and Cost For Removal of Radioactivity From Drinking Water†", George W. Reid, Peter Lassovszky, Steven Hathaway, Health Physics, vol. 48, No. 5 (May 1985), pp. 671–694.
"Removal of Radon From Water Supplies", Jerry D. Lowry, M. ASCE, Jeffrey E. Brandow, Journal Of Environmental Engineering, vol. 111, No. 4, Aug. 1985, pp. 511–527.
Perry's Chemical Engineers' Handbook Sixth Edition, Robert H. Perry, Don W. Green, James O. Maloney, Section 18, "Liquid–Gas Systems", pp. 18–1 to 18–88.
Advertising Brochure: "VOC and Radon Removal From Water".
Advertising Brochure: "We Have The Answers" By Carbonair Environmental Services.
Advertising Brochure: "Cost–Effective Remediation From The Ground Up", by Carbonair.
Single Page Product Information Sheet re Shallowtray Process U.S. Pat. No. 5,045,215.

Primary Examiner—Khanh P. Nguyen
Attorney, Agent, or Firm—Vidas, Arrett & Steinkraus

[57] ABSTRACT

Air stripping apparatus with valved downcomers.

14 Claims, 3 Drawing Sheets

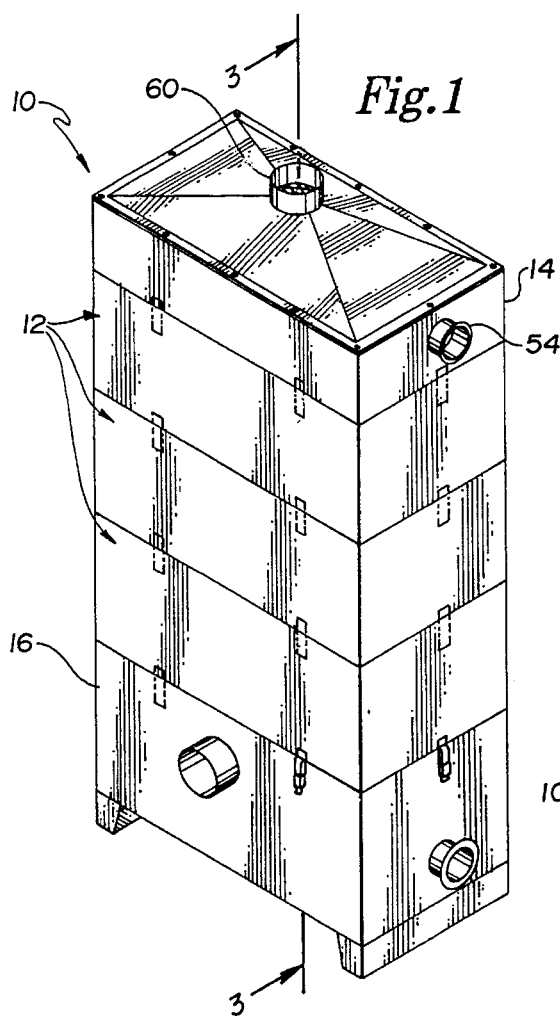
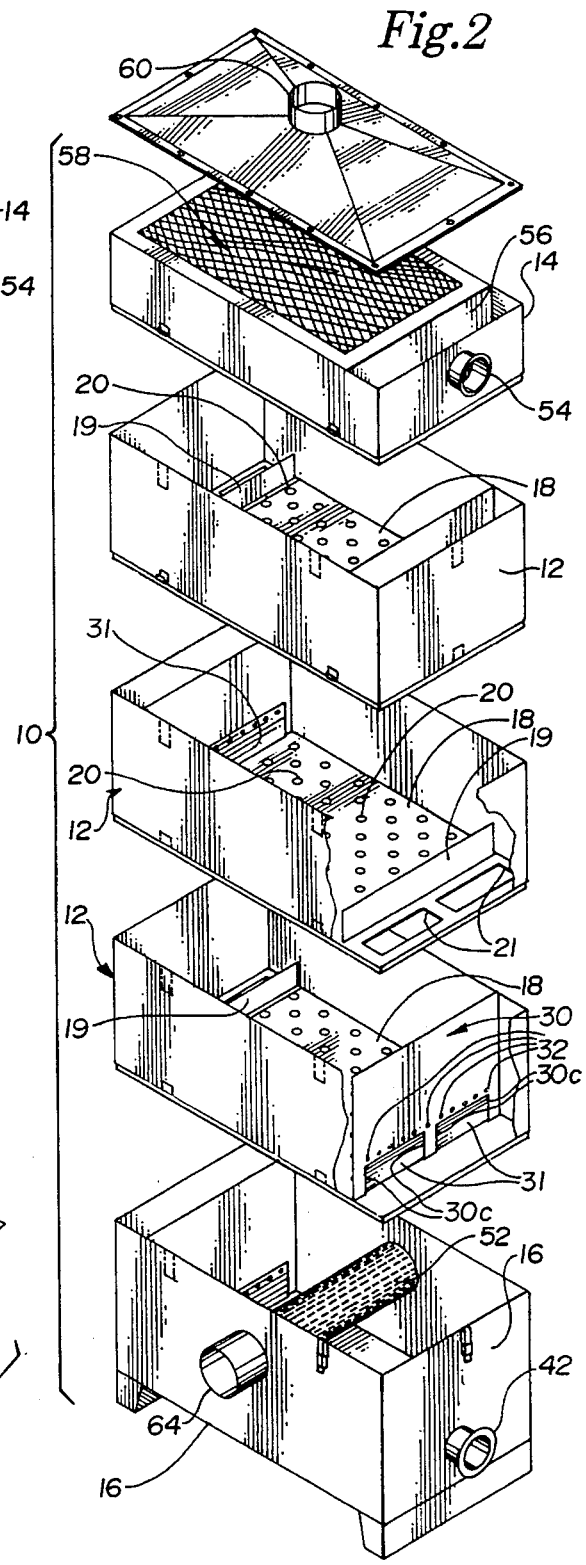
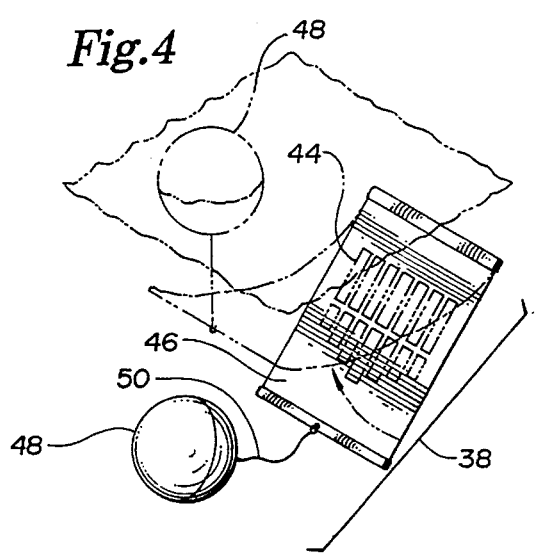

GAS-LIQUID CONTACTING APPARATUS WITH VALVED DOWNCOMER

BACKGROUND OF THE INVENTION

This invention relates broadly to gas-liquid contacting apparatus, in which mass transfer occurs between a gas and a liquid flowing in opposite directions and brought into contact with each other. For example, in one type of such apparatus specifically known as an air stripper, air and water are supplied to such an apparatus to remove volatile compounds from the water. Other examples of gas-liquid contacting apparatus are air scrubbers and distillation towers. All such apparatus may make use of the invention to advantage and are regarded as falling within the scope of this invention. However, the invention finds its preferred embodiment at present in the aforementioned air stripper apparatus and will be described specifically herein in connection with such type of apparatus as the preferred embodiment of the invention.

All of the aforementioned apparatus are sometimes referred to as systems. Although that term is not used specifically herein, the term apparatus is used herein to refer to systems, devices and apparatus generally and collectively.

This invention then relates specifically in one embodiment to a gas-liquid contacting apparatus of new and improved design for use in the removal of volatile organic compounds (VOC) from water and other liquids by air stripping. Water only is described specifically herein but this term is to be taken as meaning any liquid containing volatile compounds. Likewise, air only is described specifically herein but this term is to be taken as meaning any gasses capable of extracting volatiles from a liquid on contact therewith.

Current apparatus used for the decontamination of water and other liquids (herein generally described as water) by air stripping include the well known stripping towers and apparatus of the type shown in the following patents: 4,869,832; 4,954,147; 4,663,089; and 5/045,215, just to mention a few. There are improved air stripper designs as shown in co-pending patent application U.S. Ser. No. 08/043,264, filed Apr. 6, 1993 and assigned to the same assignee as is the subject application U.S. Pat. No. 5,378, 2461; issued Jan. 3, 1995.

That design is of the type which includes a perforated floor or sieve tray in the treatment area of the apparatus. More specifically, the design is a gas-liquid contacting apparatus in which a plurality of vertically-spaced horizontal trays are provided with a plurality of openings through which air is permitted to pass upwardly therein through. Each tray is also provided with downcomer means at opposite sides, one for conducting water from the tray above, the other for conducting water to the tray below. Liquid water flow over each tray is directed from the one downcomer from above to the other downcomer leading below. Each next lowermost tray is preferably of substantially the same configuration as the one above it.

As already noted, the trays are provided with a plurality of openings so that air is allowed to bubble upwardly through the flowing water. The air rising through the openings thus contacts the water flowing across the tray. Water level on the tray is established and is removed from the tray by flowing over a weir (a vertical plate or fence) of predetermined height and downwardly through a downcomer to the tray below.

The water preferably flows straight across the tray as specifically described herein but may flow in a meandering path as determined by the placement of baffles thereon to direct the flow path and increase the contact between the upwardly flowing air and the water providing more opportunity for transfer of any volatile contents of the water into the air.

All of the sieve tray type air stripper apparatus to date suffer from a start-up disadvantage in that during start-up the air which is introduced at the bottom of the apparatus tends to flow upwardly through the downcomers of the apparatus since they offer a path of least resistance to the air flow rather than flowing through the apertured processing tray floors (sieve trays) as occurs during normal operation of the apparatus. Consequently, since the water to be stripped is introduced at the top of the device, the stripping action does not occur in the upper trays immediately upon start-up but is somewhat delayed. As a result of this situation the initial water flowing through the apparatus is not stripped at all or is not stripped adequately as will occur once the apparatus is in full normal operation.

Also, during initial start-up with the air following the path of least resistance, i.e. , flowing upwardly through the downcomers, there is little back pressure offered to the blower, which is often a centrifugal blower type. Thus, the blower tends to run at higher flow rate and higher amperages than necessary.

This invention provides in its most preferred form a new simplified modular air stripper design which is easy to manufacture and service. The design is readily adaptable to a variety of sizes and includes a plurality of stacked stripping trays, each of which includes an apertured floor, with opposite ends defining a flow path therebetween for water undergoing stripping. The water, containing VOC's for example, is introduced into one end of an upper tray and flows across that tray to the other end and down to a lower tray through a downcomer and so forth. Air is forced through each apertured tray floor starting in the lowermost tray and exiting out the uppermost tray. As the gas bubbles through the water it strips the VOC's from the water. Stripped water exits the apparatus from a sump chamber below the bottom tray.

SUMMARY OF THE INVENTION

In accordance with the present invention, the downcomer path of least resistance for the air is closed by means of an appropriately designed valve means which effectively closes the downcomers in the apparatus to the upward passage of air while allowing the flow of water in the opposite direction. In the most preferred embodiment of the invention, this is accomplished by providing integral downcomer structure at alternating ends of the processing trays progressing downwardly in the apparatus and further providing at the bottom of each downcomer a flexible flap arrangement on the processing side thereof which closes the bottom of the downcomer when air pressure is present in the tray. When the flow of water begins in the downcomer it opens the valve allowing the water to flow into the processing area of the tray. This arrangement also provides a back pressure against which the blower must operate resulting in lower amperage and the correct air flow for the operation of the apparatus. Consequently, a new design is provided which initiates water stripping immediately at start-up with stripping starting at the top with the initial charge of water and working down rather than as in the prior art starting at the bottom and working up and allowing some water initially to escape through the system without being stripped. Additionally, more efficient operation of the electrical blower particularly centrifugal blowers is provided by the arrangement of the invention. Other unique features will be apparent from the specific description provided below.

BRIEF DESCRIPTION OF THE FIGURES

A detailed description of the invention is hereafter described with specific reference being made to the drawings in which:

FIG. 1 is a perspective view of an air stripper apparatus constructed in accordance with a preferred embodiment of the present invention;

FIG. 2 is an exploded view of the apparatus of FIG. 1 in a perspective view with cut-away portions showing a flapper valve;

FIG. 4 is a view partly in phantom showing the water outlet arrangement for the apparatus;

DETAILED DESCRIPTION OF THE INVENTION

Figure 3:
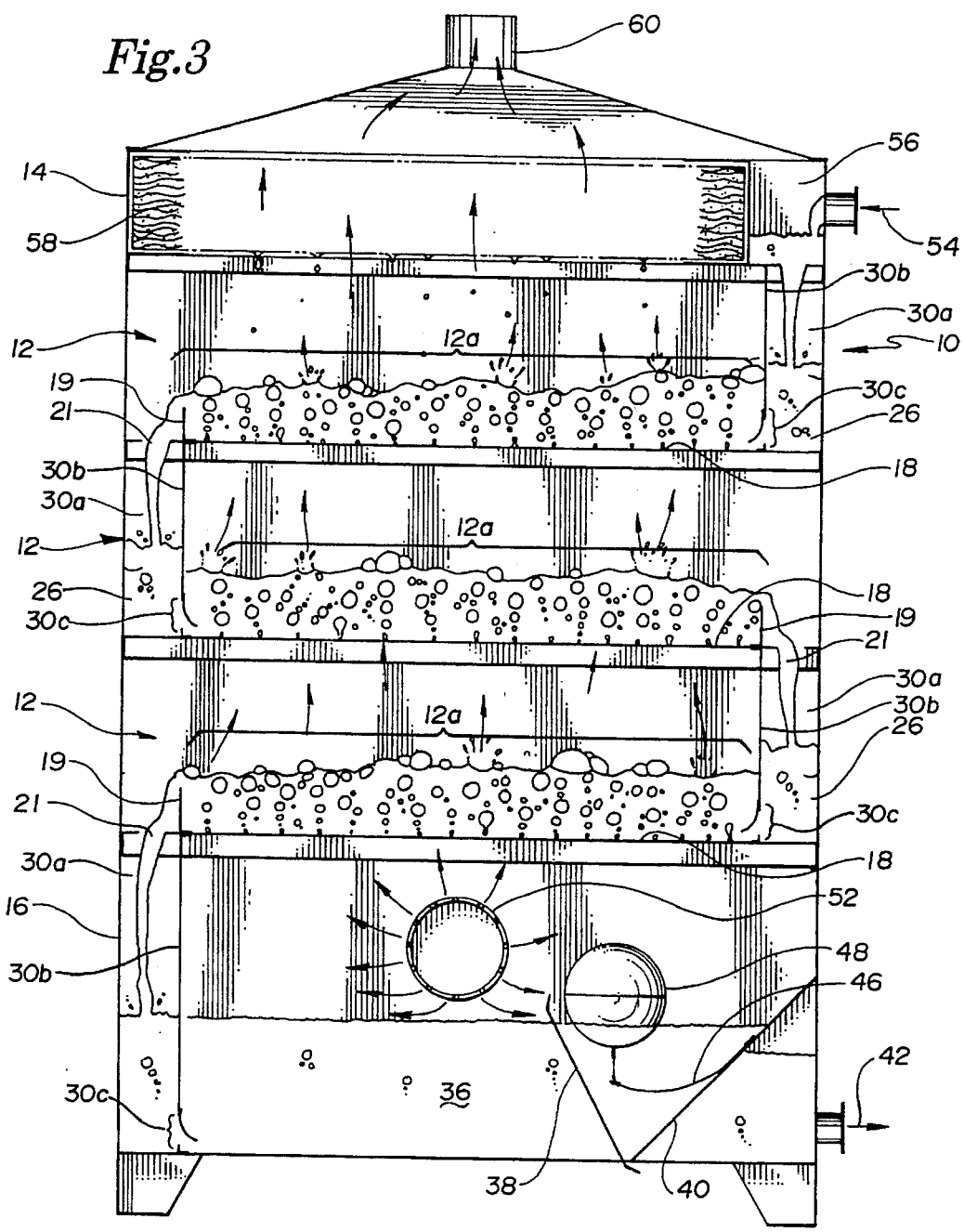
FIG. 3 is a transverse sectional view taken along line 3—3 of FIG. 1.

The most preferred embodiment of this invention is an air stripper which is of a low profile sieve tray design. It is simplified, flexible and capable of high performance.

In such units the water and air are contacted in step-wise fashion on multiple tray flows. The water enters at the top of the apparatus and flows across each tray. The air passes upwards through openings in the trays, then bubbles through the water to form "a surface of foam" which provides extreme turbulence and excellent volatilization. Since the water flows horizontally across each tray, the traveling path length of the water and the required removal efficiency can be achieved by increasing either or both the number and/or length of the trays and paths. Consequently, the units provide lower overall height than conventional packed towers.

Another feature of this particular apparatus design is that air and blower power consumption are more effectively utilized since a single air stream passes through every tray before exiting the apparatus. As a result of minimal air flows, the VOC's are concentrated and can be more effectively removed by later treatment of the air such as by vapor phase carbon treatment or the like. Lower apparatus height yields numerous other advantages: modular design configurations, rapid installation, easy integration, inconspicuous appearance, easy shipping, easy maintenance and portability are a few.

A current design for low profile air strippers is, from the top down, (a) upper demisting chamber, (b) intermediate processing trays, and (c) bottom collecting chamber or sump. The contaminated water enters near the top and flows across a process tray, then down to the next tray and so on, until it enters the sump. A downcomer is the passage provided through which the water travels downward from tray to tray or chamber to chamber. The bottom of each downcomer passage is arranged to allow the water to flow freely onto the processing tray which is positioned at the bottom of the downcomer to receive the water.

During start-up of a low profile air stripper, the air will tend to use these downcomer passages, as a preferred upward path of least resistance, instead of allowing itself to be forced upwardly through the small holes in the floor of each process tray. During start-up water enters the top tray and seeps through the small holes in each tray floor until it reaches the sump. When the water level in the sump is high enough to block off the escaping air through the downcomers, the air begins to be forced upwardly through the small holes in successive higher trays as higher and higher downcomers become blocked with water. The air must move through these holes before the stripping process can begin. Since the blocking of the downcomers by the water itself only starts at the bottom chamber and works upwardly through each successive process tray, it is possible to have many gallons of contaminated water moving through the stripper before the apparatus begins functioning fully.

This invention provides a design modification which blocks the air from entering the downcomers, yet allows water to flood the trays. Specifically, a one-way valve means is located on the process side of each downcomer. The process side is that side of the downcomer adjacent to the process area of each process tray i.e., the apertured area. During start-up the air forces the valve against the downcomer outlet openings thus sealing them. The only passage open to the air is then through the small holes in the floor of each tray. Consequently, the top tray immediately starts to process incoming water. As the water flows in, this chamber fills to the height of the weir and spills into the next downcomer. The water level rises in the downcomer until it overcomes the air pressure against the valve; then it opens the valve and the water starts to flow through the valve, evenly covering the process area, i.e., the floor of the tray. As little or no air is allowed to bypass the process area, all water that enters the stripper begins to strip immediately, from the top down in the apparatus.

Referring now to the Figures, preferred apparatus generally shown at 10 is for air stripping water of VOC's in accordance with this invention. Apparatus 10 includes a stacked series of intermediate stripping chambers, generally indicated by 12, each of which includes a process tray, a top chamber 14 and a bottom liquid collecting chamber 16. The chambers as shown are preferably of rectangular parallelepiped configuration although other shapes and geometrics may be used. Fabrication is preferably of stainless steel or plastic for durability.

Each of the intermediate processing chambers 12 includes a floor or tray 18 an area of which is apertured with numerous perforations or holes 20 to provide a process area. Holes 20 are preferably on the order of between ⅛ and ½ inch in diameter. Hole size in any particular design will depend on flow rates of water or other fluid used and the volume of air moving through the apparatus. The holes are preferably sized to prevent weeping, i.e., the dropping of contaminated water through the holes. Located on each tray 18 at the outlet end of each chamber 12 is a weir 19 of a predetermined or adjustable height and a drainage hole or holes 21 communicating with the chamber below. The drainage hole or holes 21 are inlets to downcomers, generally indicated at 30, as will be more fully described hereinbelow.

A treatment area 12a (best seen in FIG. 3) is provided in each apertured tray area between the weir 19 and downcomers 30 of each chamber 12. The height of each weir 19 is less than chamber height and is determined by water flow and desired water depth on the tray. Weir height provides a flat uniform water depth in each chamber for uniform pressure drop through each tray 18.

Figure 8:
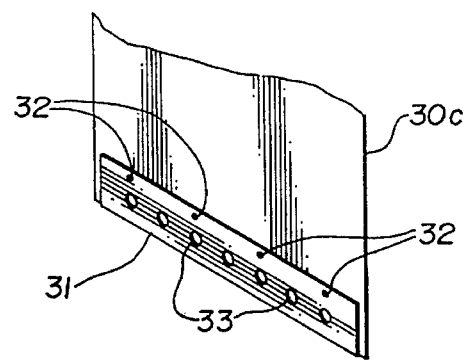
FIG. 8 is a view in perspective of the flapper valve referred to with reference to FIG. 2, this embodiment being apertured.

Downcomers 30 preferably comprise a passageway 30a positioned at alternate side ends of chambers 12 and chamber 16. Chambers 30a are formed by wall 30b and include outlet opening or openings 30c at the bottom thereof. At the top of each downcomer 30 is opening or openings 21. Opening or openings 30c are covered on the process side (interior side toward treatment chamber 12) by a flexible flap 31 (best seen in FIG. 3) which may be of rubber or a similar elastomer attached at its top toward the bottom of wall 30b by a series of fasteners 32 so as to cover opening 30c. Flap 31 provides a unidirectional valve means allowing water to flow from the downcomer onto the tray but not allowing any substantial air flow from chamber 12 into the downcomer. The flexible flap 31 may have holes 33 punched through it, to allow entrapped air to escape through the flap. This is shown in the embodiment of FIG. 8. Entrapped air captured behind the flap might influence the flap's ability to close.

Figure 5:
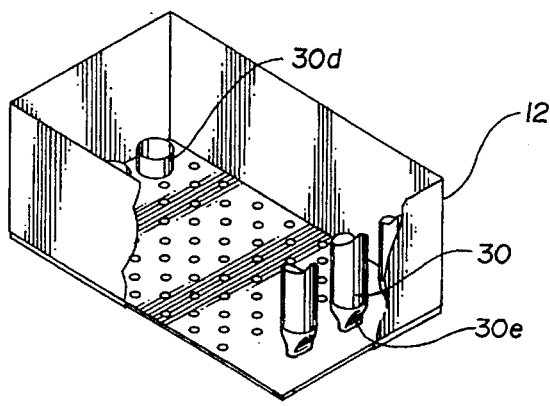
FIG. 5 is a perspective view with parts cut-away showing a alternative downcomer design for the apparatus.

Alternatively, as seen in FIG. 5, a downcomer arrangement such as a series of multiple pipes 30 or any configuration suitable to convey water to the chamber and tray below may be used. The downcomers or pipes 30 have at the bottom of each a one-way valve means such as a duck bill type valve 30e as shown in FIG. 5. Flow or pressure in the correct direction, downward, will force the bills open, allowing passage, while flow or pressure in the opposite direction will close the duck bill valve blocking air from escaping upwardly through the downcomer pipes. The water level in the downcomers will increase until it overcomes the air pressure on the outside of the duck bill valve, thus forcing open the bills allowing water to flow through the valve and ont the process tray area in chamber 12. As shown in FIG. 5, the upper ends 30d of the pipes 30 may be used above the tray to provide the function of weir 19.

The bottom chamber or sump 16 functions to collect treated water 36 (best seen in FIG. 3) which has flowed downwardly through the stripping chambers 12. The water enters through the downcomer 30a from the stripping chamber 12 immediately above chamber 16. Chamber 16 may include a modulating outlet valve 38. The valve may be set at a slant (as shown in FIGS. 3 and 4) or placed horizontally on the floor of chamber 16 or vertically against end wall of chamber 16.

Figure 6:
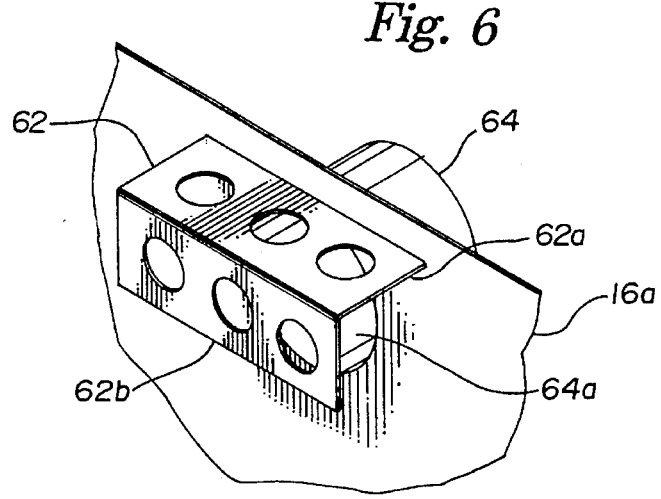
FIG. 6 is a fragmentary view showing an air inlet and diffuser arrangement for the liquid collecting chamber in which air is introduced into the apparatus.
Figure 7:
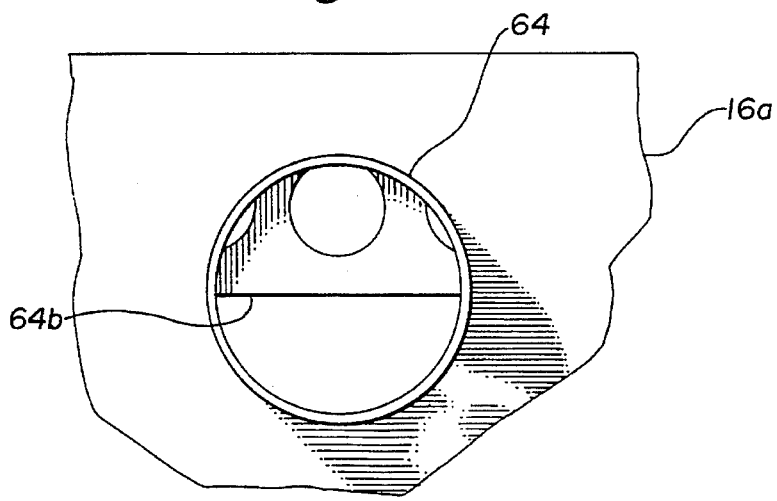
FIG. 7 is another fragmentary view of the diffuser/inlet arrangement of FIG. 6 as seen from its exterior end looking into the collecting chamber.

Bottom chamber 16 also functions to introduce air into the apparatus. This is preferably accomplished by means of an arrangement which diffuses the air throughout chamber 16 to provide uniform distribution of air pressure upwardly through the process area of the tray 18 immediately above chamber 16. Such an arrangement will include an air inlet means such as slotted manifold means 52 (best seen in FIGS. 2 and 3) to which a source of pressurized air is converted, such as a blower (not shown). Alternatively or in combination with the manifold 52, other diffusion means may be included as shown in FIGS. 6 and 7. The arrangement of these Figures comprises an inlet conduit 64 which extends into a sidewall 16a of chamber 16 (FIG. 6). The interior end 64a of conduit 64 is at least partially covered by an apertured diffuser screen 62 comprised of a horizontal section 62a positioned over the top of the interior end 64a of conduit 64 and a vertical section 62b positioned in from of the upper portion of the interior end 64a of conduit 64 (best seen in FIG. 7).

For operation of the apparatus, it is necessary to maintain a predetermined amount of water in chamber 16 before allowing any to flow out of the chamber. A flooded outlet 42 best seen in FIG. 3 is necessary to block air and interior pressure from escaping through that outlet. To maintain a certain level of water in chamber 16 a valving system 38 may be arranged as shown at FIGS. 3 and 4 which is comprised of a flexible elastomer seal flap 46 or the like and which functions as a valve door to cover the outlet slots 44. A float 48 is attached to flap 46 as shown by a wire 50 or the like. Such a valving system is sized and configured depending on chamber size, flow rate and outlet location to collect the necessary predetermined amount of water before opening the outlet and matching the outlet flow to the inlet flow without allowing air to escape.

Referring now FIG. 3 again and specifically to the top chamber 14 as shown therein, the chamber includes an inlet port 54 which allows for the introduction to the apparatus of water to be treated. The water flows into chamber 14 as shown in area 56, into downcomer 30 and into the first intermediate stripping chamber 12 and tray 18 and hence downwardly through the apparatus, as is described herein with reference to the operation of the apparatus.

Preferably included in chamber 14 is a demister 58, which may be of fiberglass, plastic or metal mesh. The purpose of the demister is to collect any entrained liquid in the air stream and prevent it from escaping the apparatus along with the pressurized air. The pressurized air rising through the apparatus can upon exiting at air outlet 60 be passed to a variety of further treatment means (not shown).

OPERATION

Water contaminated with VOC's is, as already noted, examplary of the gas-liquid contacting treatment with which this invention is concerned. Such contaminated water is pumped or otherwise introduced to the apparatus through inlet 54. It flows downwardly into chambers 12 and onto trays 18 through the downcomer arrangement 30, and establishes a cross-flow path on each chamber tray from which it passes downwardly to the next successively lower chamber 12 and tray 18 to flow in an opposite direction and so on until it enters the bottom or collection chamber 16.

Pressurized air is introduced to the apparatus through air inlet 64 in bottom chamber 16. The air flows upwardly through the apertured trays 18 of the stripping chambers where it flows through the water passing over the trays, thereby stripping and picking up VOC's from the water as the air passes upwardly through the apparatus chambers. The air pressure is preferably high enough to help prevent weeping of water downwardly through the apertures.

When the air reaches the top chamber 14 it passes through the water demister 58 and exits through air outlet 60 carrying the VOC's stripped from the water.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is as follows:

1. Air stripping apparatus comprising a stripping chamber having an apertured floor for admitting air into the chamber and a pair of spaced inlet and outlet means for defining a flow path therebetween for water to be stripped, the inlet means comprising a downcomer having upper and lower ends and unidirectional valve means associated with the lower end for allowing the flow of water into the chamber out of the downcomer lower end and preventing the flow of air into the downcomer lower end and wherein the lower end of the downcomer includes an outlet opening having a lower portion coincident with the tray surface which receives water from the downcomer through the opening and the valve means comprises a flap having a top edge and a bottom edge relative to the opening whereby the lower edge is normally adjacent to the tray surface when the valve means is closed.

2. The apparatus of claim 1 wherein the opening is rectangular as is the valve flap.

3. Apparatus for decontaminating water containing volatile organic compounds by air stripping the water, the apparatus comprising a plurality of stacked stripping chambers, the chambers being constructed and arranged to allow the flow of water to be treated downwardly through successive stripping chambers in each of which the water flows across the chamber floor and to allow the flow of air upwardly through successive chambers and through the water on the chamber floors, the apparatus further comprising a top chamber into which water to be treated is first admitted to the apparatus to flow downwardly therefrom through the stacked stripping chambers and a bottom chamber below the stacked stripping chambers from which treated water is discharged after treatment and into which air is supplied to flow upwardly through the stacked stripping chambers the top chamber and the intermediate stacked stripping chambers each having a chamber floor containing a plurality of apertures therein for allowing air introduced into the bottom chamber to flow upwardly through successive chambers and a spaced water inlet and outlet area in the top chamber and in each stripping chamber for admitting water introduced in the top chamber to flow successively downwardly to each stripping chamber and for establishing a cross-flow of water across each chamber floor from the inlet to the outlet area, the spaced inlet and outlet areas being constructed and arranged so as to direct the cross-flow in opposite directions with respect to adjacent chambers; and wherein the outlet areas include drain means positioned on the chamber floor for draining water from each chamber; and downcomer means associated with the top chamber and each stripping chamber, each downcomer means extending downwardly from one chamber to another chamber immediately below, each downcomer means defining a downcomer inlet at its upper end for receiving water from a chamber outlet area and a downcomer outlet at its lower end and including one-way valve means associated with the lower end of the downcomer and its outlet for allowing water to flow out of the downcomer outlet through the associated chamber inlet area and onto the floor at a chamber inlet area while preventing the entrance of air from the chamber into the downcomer; the bottom chamber being constructed and arranged to collect treated water and including a bottom chamber outlet for releasing the treated water; and means for admitting pressurized air to the bottom chamber for establishing and maintaining an upward flow of air through the stacked stripping chambers to the top chamber, the top chamber further including means for capturing water droplets entrained in the air stream and means for allowing the air to exit the apparatus and wherein the lower end of each downcomer includes an outlet opening having a lower portion coincident with the tray surface which receives water from the downcomer through the opening and the valve means comprises a flap having a top edge and a bottom edge the flap being constructed and arranged to close the opening by mounting the top edge relative to the opening whereby the lower edge is normally adjacent to the tray surface when the valve means is closed.

4. The apparatus of claim 3 wherein the opening is rectangular as is the valve flap.

5. The apparatus of claim 3 including a plurality of adjacent downcomers between each tray.

6. In an air stripping apparatus comprising, from the top down: a top water introduction chamber, stripping chambers and a bottom water collecting chamber, and wherein at least the stripping chambers are interconnected by downcomer means having upper and lower ends to allow the downward flow of water through the apparatus, the improvement comprising valve means constructed and arranged in the lower ends of the downcomer means for substantially preventing the entrance of air into the downcomers and flow thereof upwardly therethrough while allowing the flow of water downwardly therethrough into the chambers and through the apparatus from chamber to chamber and wherein the lower end of each downcomer includes an outlet opening having a lower portion coincident with the tray surface which receives water from the downcomer through the opening and the valve means comprises a flap having a top edge and a bottom edge the flap being constructed and arranged to close the opening by mounting the top edge relative to the opening whereby the lower edge is normally adjacent to the tray surface when the valve means is closed.

7. The apparatus of claim 6 wherein the opening is rectangular as is the valve flap.

8. The apparatus of claim 6 including a plurality of adjacent downcomers between each tray.

9. Gas-liquid contacting apparatus comprising in combination a plurality of vertically-spaced horizontally-disposed trays therein each provided with a plurality of gas openings through which gas is permitted to pass upwardly through the apparatus, each of said trays having at a first location a weir, and a plurality of downcomer conduits having upper inlets for liquid, each of said inlets communicating with one of said trays on the other side of said weirs from the gas openings of said trays, said each of downcomer conduits extending down to a next lower tray to a point lower than the liquid level thereon, each of said trays having a second location spaced from said first location adapted to receive liquid from the lower end of said downcomer conduit extending down from the next tray above, the floor areas of said trays defining a path permitting flow of liquid from said second location to said first location, each of said downcomer conduit lower ends including at said second location unidirectional valve means for establishing and maintaining one-way flow of liquid from each downcomer to each tray and wherein the lower end of each downcomer includes an outlet opening having a lower portion coincident with the tray surface which receives water from the downcomer through the opening and the valve means comprises a flap having a top edge and a bottom edge the flap being constructed and arranged to close the opening by mounting the top edge relative to the opening whereby the lower edge is normally adjacent to the tray surface when the valve means is closed.

10. The apparatus of claim 9 wherein the opening is rectangular as is the valve flap.

11. The apparatus of claim 9 including a plurality of adjacent downcomers between each tray.

12. In a gas-liquid contacting apparatus in which a plurality of vertically-spaced trays having perforations permitting gas flow upwardly therethrough are provided with downcomers at opposite sides, one from the tray above, the other to the tray below, and liquid flow over the tray from one downcomer to the other, means associated with the lower end of each downcomer providing for the introduction of liquid flow onto the tray, the improvement comprising unidirectional valve means cooperating with the lower end of each downcomer and the associated means to substantially prohibit air flow into the downcomer and to allow the flow of water out of the downcomer onto the tray and wherein the lower end of each downcomer includes an outlet opening having a lower portion coincident with the tray surface which receives water from the downcomer through the opening and the valve means comprises a flap having a top edge and a bottom edge the flap being constructed and arranged to close the opening by mounting the top edge relative to the opening whereby the lower edge is normally adjacent to the tray surface when the valve means is closed.

13. The apparatus of claim 12 wherein the opening is rectangular as is the valve flap.

14. The apparatus of claim 12 including a plurality of adjacent downcomers between each tray.

* * * * *

UNITED STATES PATENT AND TRADEMARK OFFICE
CERTIFICATE OF CORRECTION

PATENT NO. : 5,478,507
DATED : Dec. 26, 1995
INVENTOR(S) : David E. Bros It is certified that error appears in the above-identified patent and that said Letters Patent is hereby corrected as shown below:

Col. 1, line 41, delete "5/045,215" and insert -- 5,045,215 --;

Col. 5, line 38, delete "ont" and insert -- onto --;

Signed and Sealed this

Fourth Day of June, 1996

*Attest:*

BRUCE LEHMAN

*Attesting Officer*     *Commissioner of Patents and Trademarks*